United States Patent [19]
Ginaven

[11] 3,993,567
[45] Nov. 23, 1976

[54] BAR OR WIRE-LIKE ELEMENTS FOR USE IN CLASSIFYING AND SCREENING APPARATUS

[75] Inventor: Marvin E. Ginaven, Springfield, Ohio

[73] Assignee: The Bauer Bros. Co., Springfield, Ohio

[22] Filed: Sept. 12, 1973

[21] Appl. No.: 396,351

Related U.S. Application Data

[62] Division of Ser. No. 157,254, June 28, 1971, Pat. No. 3,777,893.

[52] U.S. Cl. .............................. 210/498; 29/193.5; 209/393
[51] Int. Cl.² ...................................... B01D 39/10
[58] Field of Search ........... 210/483, 485, 495, 499, 210/498; 209/393, 395, 400; 29/193, 193.5

[56] References Cited
UNITED STATES PATENTS

| 470,787 | 3/1892 | Hill .................................... 29/193.5 |
| 1,117,897 | 11/1914 | Paget et al. ......................... 209/393 |
| 1,639,068 | 8/1927 | Williams ............................. 29/193.5 |
| 3,037,630 | 6/1962 | Bixby ............................. 210/499 X |
| 3,116,239 | 12/1963 | Bixby .................................. 209/395 |
| 3,169,111 | 2/1965 | Rose et al. .......................... 210/499 |
| 3,452,876 | 7/1969 | Ginaven ............................. 210/409 |

FOREIGN PATENTS OR APPLICATIONS 13,493 9/1903 Germany ........................... 209/393

Primary Examiner—Frank W. Lutter
Assistant Examiner—William A. Cuchlinski, Jr.
Attorney, Agent, or Firm—Jerome P. Bloom

[57] ABSTRACT

A screen element for joining with other like elements in defining a screen surface over which liquid slurry embodying solids may flow for separating and classifying purposes, said screen element being designed to orient in a sense transverse to a slurry flow and having an elongate bar-like form a surface portion of which provides a segment of the screen flow surface, said element being characterized by at least one portion thereof intermediate its ends being laterally offset with respect to said ends, said laterally offset portion being configured to provide that the flow surface portion thereof has a progressively changing width intermediate its ends.

6 Claims, 6 Drawing Figures

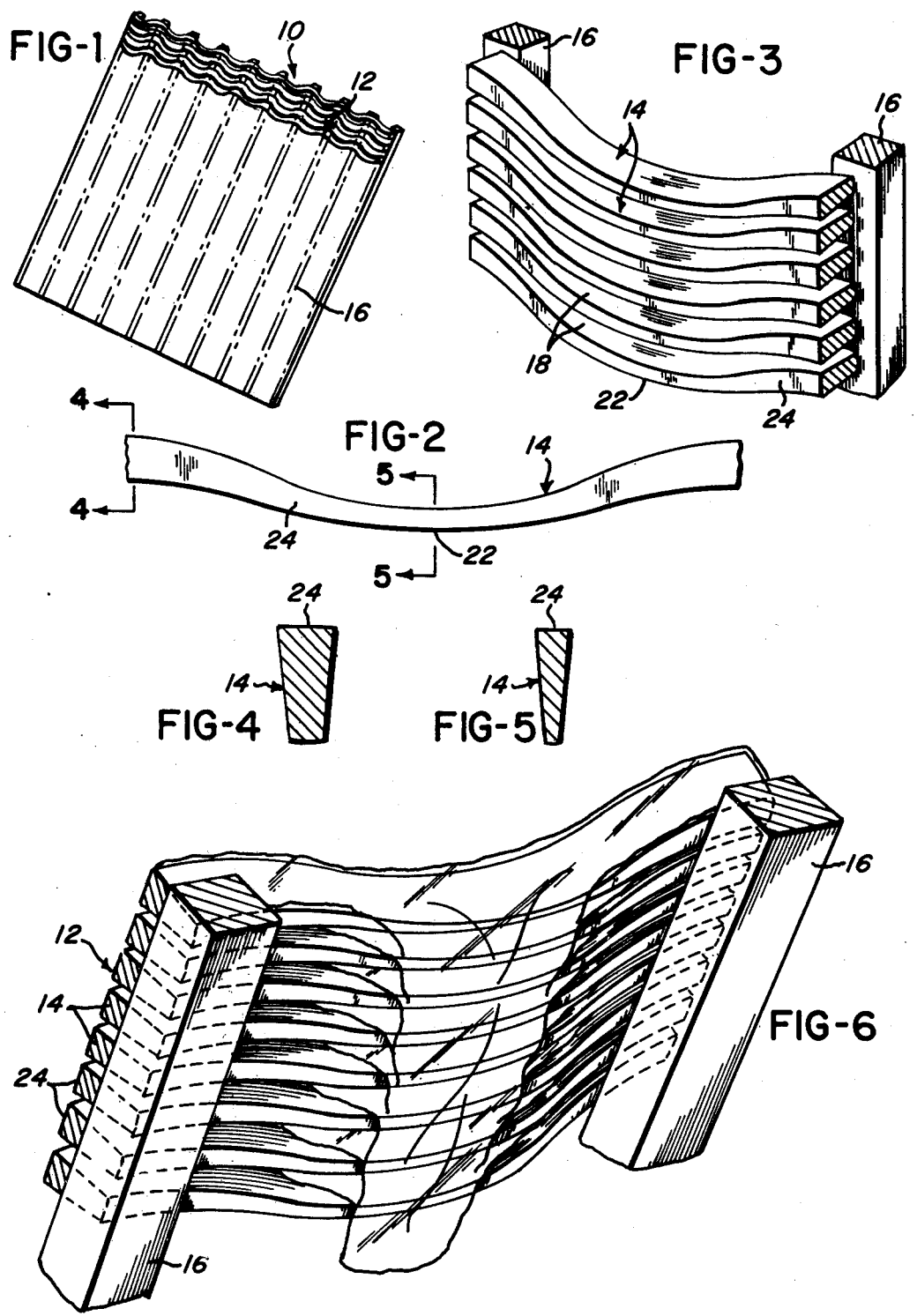

BAR OR WIRE-LIKE ELEMENTS FOR USE IN CLASSIFYING AND SCREENING APPARATUS

The invention subject of this application is a division of applicant's co-pending application for U.S. Letters Patent, Ser. No. 157,254, filed June 28, 1971 for "CLASSIFYING AND SCREENING APPARATUS", now U.S. Pat. No. 3,777,893, dated Dec. 11, 1973.

BACKGROUND OF THE INVENTION

This invention relates to bars or wire-elements providing improvements in screen type separating and classifying devices. Embodiments have particular advantages in application to side hill and other screens useful in separating a liquid vehicle from entrained solids. For purposes of illustration, but not by way of limitation, the invention will be described herein with reference to its application to screen type structures such as illustrated in U.S. Pat. No. 3,452,876, issued July 1, 1969.

The separation of solids, particularly fibrous solids, from a liquid waste flow or from a liquid vehicle in the course of a processing step is a problem of utmost concern in many industries. This problem is particularly evidenced, for example, in the pulp and paper industry, the meat processing industry, the tanning industry and that related to sewage disposal. The prime area of concern is threefold, to recover usable materials, to avoid unnecessary pollution of the environment and to conserve usable liquids. The objectives of recovery of usable solids, avoiding pollution and conserving usable liquids has proven to be very difficult to achieve and in accordance with the conventional practice to involve much time, labor and expense.

The invention subject of the aforementioned U.S. Pat. No. 3,452,876 has enabled a considerable advance in the solution of the problems above posed. Embodiments have in many applications proven much more effective than other prior art screen devices and to simply and economically function with a substantial degree of efficiency. However, there has yet remained a need for means which will further expedite the more rapid separation of a liquid vehicle from its entrained solids and for means capable, in certain applications, of more effectively acting on a slurry flow wherein the liquid vehicle contains fatty and oily substances or the like of a nature to render it sluggish in movement and most resistant to a fast or ready separation from its entrained solids. The present invention affords the means to answer these needs evidenced in the prior art.

SUMMARY OF THE INVENTION

The present invention provides bars or wire-like screen elements enabling a screen construction to a surface of which a slurry may be applied in a thin sheet-like flow and in the course of which such flow will rapidly separate into liquid and solid components. It enables an improved and more rapid separation of the liquid component of a slurry from defined solids, achieved in such a manner as to minimize the chance of blinding the screen or any portion thereof. It has most significant applications to the type of slurry wherein the liquid vehicle is relatively thickened by a contained medium which makes it more difficult to separate therefrom the contained solids.

Embodiments of the invention have the form of bar or wire-like elements of non-uniform thickness. The use thereof in preferred embodiment provides a screen flow surface wherein there are spaced openings which are laterally extended in a sense transverse to the flow of an applied slurry and non-uniform in dimension, within the bounds thereof, in the sense of flow. In a uniform arrangement of said bars or wires, they form openings such that as a sheet-like flow of a slurry is caused to move over the screen flow surface, the liquid vehicle will follow and adhere to the flow surface, and, on reaching said openings, have induced thereon a lateral force influence. This causes the liquid to follow the edges of said openings and to rapidly exit through the screen, as accommodated by the expanded portions of the openings. As will be seen, particularly in reference to an inclined screen flow surface, the controlled liquid exit so provided enables a more effective passage of liquid through the screen in a single pass, particularly where the liquid is relatively thickened, than in the case where the screen openings are defined by parallel edges.

In use of embodiments of the invention to produce screens, the invention bars or wires are so arranged in conjunction with underlying tie bars as to produce a screen having openings in the nature of tapered slots. Preferred configurations of the bars or wires are such to produce arcuate slots the apex portions of which will be directed in the sense of flow and define relatively expanded portions of the slots in the sense of flow.

It is therefore a primary object of the invention to provide improvements in screen bars or wires useful in fabricating screen type separating and classifying units of the class described rendering them economical to fabricate, more efficient and satisfactory in use and adaptable to a wider variety of applications.

Another object of the invention is to provide separating or classifying devices embodying bars producing a flow surface which is less likely to blind when subjected to a flowing slurry.

A further object of the invention is to provide a screen flow surface utilizing an improved wire or bar form which increases its separating efficiency.

Another object of the invention is to provide means enabling a more effective screen for extracting liquid from a slurry flow enbodying solids.

A further object of the invention is to provide improved bars or wires facilitating a construction of a tapered slot screen possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein one but not necessarily the only form of embodiment of the invention is shown, FIG. 1 is a view of a screen section embodying the improvements of the present invention;

FIG. 2 is a plan view of a section or segment of a bar or wire element embodied in the screen section of FIG. 1;

FIG. 3 is an enlarged view of a segment of the screen flow surface of FIG. 1;

FIGS. 4 and 5 are sectional views taken respectively of lines 4—4 and lines 5—5 of FIG. 2, and rotated 90°; and FIG. 6 illustrates the through flow achieved at the underside of the screen illustrated.

Like parts are indicated by similar characters of reference throughout the several views.

Referring to the drawings, the invention is illustrated as embodied in an inclined screen unit 10 over the surface 12 of which a slurry will be caused to move in a sheet-like flow, for separating or classifying purposes. To comprehend the nature and character of the separating action of the invention structure as so embodied, one must understand that as a sheet-like flow of slurry moves down the inclined flow surface 12, the liquid component thereof will tend to adhere to and follow the line of the flow surface. At the same time contained solids will inherently move up to the upper or outermost layers of the flow to skim over the screen openings, as liquid, following the line thereof, exits therethrough.

Now looking at the drawings in detail, it may be seen that in accordance with the preferred embodiment there illustrated, the bars or wires 14 are arranged to form the screen 10 by being positioned in longitudinally spaced relation and oriented transversely of and generally at right angles to the direction of anticipated flow. At their undersurface, the bars 14 are bridged by and interconnected through the medium of longitudinally extending, transversely spaced, tie bars 16. The upper edges of the bars 14 define the screen flow surface which has preferably but not necessarily, a planar configuration. The flow surface may, for example, be formed as a series of successively inclined planar segments as illustrated in the aforementioned U.S. Pat. No. 3,452,876.

It is noted that only so much of a screen structure is here shown and described as may be necessary for an understanding of the invention, and particularly the flow surface defined thereby. As to conventional framing, feed and/or orientation thereof in use, reference is had by way of example to such structure and disclosure as evidenced in said U.S. Pat. No. 3,452,876. With knowledge thereof and the present disclosure, any mechanic versed in the art can embody the present invention in effecting an improved side hill type screen unit the flow surface of which may be in single or plural planes.

As seen in the drawings, the bars or wires 14 form, with the tie bars 16, a series of transversely and longitudinally spaced screen openings or slots 18 of a laterally extended tapered character. Thus, while generally uniform in width, as shown, the slots are non-uniform in dimension of their opening in the sense of flow.

As here applied, each bar or wire 14 is formed and designed to present a single arc between adjacent tie bars 16, the apex 22 of which is centered and projected in the sense of flow. This arc as thus defined is provided by a bar or wire segment having, in the sense of flow and in the screen flow surface, a changing thickness. As seen, the bar or wire is thinned at the apex 22 of the arc and gradually thickened from said apex to the respective lateral extremities of the arc at the adjacent tie bars 16. As a consequence, the assembly of the bars or wires 14 to the tie bars 16 inherently produces screen openings or slots 18 between the tie bars which are expanded to produce a maximum dimension in the sense of flow at their centers and formed to taper to a reducing dimension in the sense of flow to their lateral extremities. Thus, each bar or wire has portions which differ in thickness, to inherently provide in the application thereof in a uniform non-uniform, to the tie bars 16, slots which are nonuniform, end to end, with respect to their dimension in the sense of a slurry flow thereacross.

In the preferred form of bar or wire 14, the cross section thereof will be of a generally triangular character, the base portion being uppermost and defining a part of the screen flow surface. As seen in FIGS. 3 and 5, the triangular cross section of the bars or wires 14 is thinned at the apex portions 22 thereof.

As seen in the drawings, the application of the invention embodiments provides a screen having an inclined flow surface which is defined by the base portions 24 of the bars or wires 14. Defined in said flow surface, by the arc formed segment structure of bars or wires 14, are the tapered openings or slots 18, the lateral extremities of which are defined by adjacent tie bars 16. Further, the slots 18 are so tapered to present the maximum dimension thereof in the direction of flow across the surface 12 at their centers.

With the flow surface of a screen unit such as described inclined to a horizontal, on delivery of a slurry embodying fibrous solids to move in a sheet-like flow across the surface 12 from the upper limit thereof, the following will occur. The liquid vehicle of the desirable solids will move down over the flow surface with the underlayer thereof adhering to and following the lines of the bars or wires 14 and the arcuate edges of the slots 18 defined thereby. As a natural consequence of the slurry flow, the desirable solids will be lifted and moved to the upper or outer layers of the flow, causing such solids to tend to skim over the slots. As the liquid underlayer of the slurry flow reaches a slot and follows the lines of the rimming edge thereof, lateral force effects will be induced in the liquid. The result is a sidewise movement of liquid away from the tie bars 16 and to the apex portions 22 of the bars 14. Thus, the primary path for exit of the liquid is concentrated at the widest portion of the screen opening or slot. Moreover, as the liquid will follow the bar line, it bends around the bars 14 from the screen flow surface and, in moving to and through the screen openings, it is concentrated and centered so as to increase the velocity of its through flow.

A result of the described action of the liquid vehicle following the line of the apex portions 22 is to more effectively clean the slots and prevent blinding by contained substances. This is most important in the case of slurries of a more sluggish character, such as those which may embody fatty or oily substance.

The invention thus expands the effective capabilities of screens of the type described.

The significance of the concentrated and speedy separation of a liquid vehicle is seen with reference to FIG. 6 of the drawings which shows the flow through characteristics of a separated liquid at the bottom of the invention screen.

Of course there is a successive separation of the liquid vehicle in the course of the slurry flow down the incline of the screen 10, leaving to discharge from the surface of a screen a most desirable solid portion of a slurry.

The net result is a substantial savings in time, effort and expense for the procedure described, particularly in the case of normally difficult to separate substances, and optimal speedy reclamation of applied substances.

It will be self-evident from the foregoing that by providing the bars or wire-like means to form the screen flow surface in accordance with the invention to have portions which differ in thickness as described, one can have the benefits of the improvements of the invention merely by placing the bars or wires over the tie bars at uniform intervals. This inherently produces the slots which have a most important function by reason of the expansion of the dimension thereof in the line of a slurry flow thereacross.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. A screen element for joining with other like elements in defining a screen surface over which liquid slurry embodying solids may flow for separating and classifying purposes, said screen element being designed to orient in a sense transverse to a slurry flow and having an elongate bar-like form a surface portion of which provides a segment of the screen flow surface, said element having at least one portion thereof intermediate its ends laterally offset with respect to said ends, said laterally offset portion being configured to provide that the flow surface portion thereof has a progressively changing width intermediate its ends.

2. A screen element as in claim 1 wherein said laterally offset portion of said elongate bar-like element has an arcuate form and the width thereof is relatively thinned in the direction of its apex, at least within the portion thereof which includes its flow surface.

3. A screen element as in claim 2 wherein said bar-like element has a plurality of said offset portions intermediate its ends.

4. Apparatus as in claim 1 wherein said element has its said flow surface portion thereof relatively reduced in width with respect to adjacent flow surface portions of said element at longitudinally spaced relatively uniform intervals intermediate the ends of said element and each of said flow surface portions of said element which is relatively reduced in width is located to form part of one of said laterally offset portions of said element.

5. Apparatus as in claim 1 wherein the width of the flow surface portion of said element is greater than that of the surface portion of said element which is remote therefrom.

6. Apparatus as in claim 1 wherein said element has a plurality of said laterally offset portions intermediate its ends arranged to be commonly offset in the same direction, which direction, in a joining of a plurality of said elements to form a screen flow surface, is in the direction of a slurry flow in a sense generally at right angles to said elements.

* * * * *